United States Patent
Vance et al.

(10) Patent No.: US 8,057,290 B2
(45) Date of Patent: Nov. 15, 2011

(54) DANCE RING VIDEO GAME

(75) Inventors: Joseph Alton Vance, Castaic, CA (US); Daniel Jeremiah Tyrrell, Studio City, CA (US); Matthew Stephen Allmer, San Francisco, CA (US); Michael Robert McAnaney, Alameda, CA (US); Sean J. Krankel, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 515 days.

(21) Appl. No.: 12/334,751

(22) Filed: Dec. 15, 2008

(65) Prior Publication Data

US 2010/0151948 A1   Jun. 17, 2010

(51) Int. Cl.
  *A63F 9/24*    (2006.01)
  *A63F 13/00*   (2006.01)
  *G06F 17/00*   (2006.01)
  *G06F 19/00*   (2011.01)

(52) U.S. Cl. .............................. 463/7; 463/36; 345/166
(58) Field of Classification Search .................. 345/166; 463/7, 36, 37
  See application file for complete search history.

(56) References Cited

U.S. PATENT DOCUMENTS

| | | | |
|---|---|---|---|
| 6,554,706 B2 * | 4/2003 | Kim et al. | 463/36 |
| 6,908,388 B2 | 6/2005 | Shimizu et al. | |
| 7,044,857 B1 | 5/2006 | Klitsner et al. | |
| D567,243 S | 4/2008 | Ashida et al. | |
| 2002/0094852 A1 | 7/2002 | Fujioka et al. | |
| 2005/0007384 A1 | 1/2005 | Yamada et al. | |
| 2005/0216867 A1 | 9/2005 | Marvit et al. | |
| 2006/0242607 A1 | 10/2006 | Hudson | |
| 2007/0259717 A1 | 11/2007 | Mattice et al. | |
| 2007/0262998 A1 | 11/2007 | Boswell et al. | |
| 2007/0265082 A1 | 11/2007 | Shimura et al. | |
| 2007/0296723 A1 | 12/2007 | Williams | |
| 2007/0298885 A1 | 12/2007 | Tran | |
| 2008/0042973 A1 | 2/2008 | Zhao et al. | |
| 2008/0070655 A1 | 3/2008 | Tanabe | |
| 2009/0191968 A1 * | 7/2009 | Johnson et al. | 463/37 |
| 2009/0325710 A1 * | 12/2009 | Filer et al. | 463/42 |

* cited by examiner

*Primary Examiner* — Fernando L Toledo
(74) *Attorney, Agent, or Firm* — Marsh Fischmann & Breyfogle LLP; Kent A. Lembke

(57) ABSTRACT

A video game application provided on storage media such as optical disks readable by computers, video game consoles, or other electronic devices to provide a ring dance game including sensing movement and position of two handheld controllers. The game method includes displaying a heads up display (HUD) on a screen that includes a dance ring defined by six or more target elements or ring segments that are positioned in different zones of the HUD ring such as on the periphery of the dance ring. Cue elements associated with a right hand controller and a left hand controller emanate in a pattern from the ring center and travel outward in the differing zones to strike the target elements. Play involves a player dancing by moving the handheld controllers in response to the cues striking the target elements, which allows a game designer to create a dance game with multi-directional, two-hand cues.

20 Claims, 6 Drawing Sheets

DANCE RING VIDEO GAME

BACKGROUND OF THE INVENTION

1. Field of the Invention

The present invention relates, in general, to video games run by or played on video game consoles and systems, and, more particularly, to a dance ring video game with multi-directional dance cues and enhanced player interaction for use with video game systems or consoles that utilize handheld controllers adapted for sensing controller movement and spatial positioning, such as with accelerometers and gyroscopes.

2. Relevant Background

There is extreme competition in the electronics industry to produce video game consoles that appeal to consumers or game players and that allow for market growth. For example, video game console or system designers have provided enhanced game play by significantly increasing graphics and processor capabilities to provide enhanced animation capabilities and responsiveness to user input. More recently, there has been a push to provide an improved game interface for video games to provide game players with a more realistic and interesting gaming experience.

An important part of the game interface is the controller used by the player to provide user input and interact with game elements displayed on a monitor (e.g., a TV screen, a computer monitor, and the like). With a typical game console, a single handheld controller is provided for each player to provide user input to control his or her displayed player character or other animated game elements. A typical controller is held in two hands and the player uses his or her thumbs to control the in-game action with buttons, D-pads, joysticks, and the like provided on an upper surface of the controller housing. The controller is arranged such that the index or other fingers are used to pull triggers or press buttons provided on the front side of the controller housing in order to shoot guns or perform other functions (e.g., make a player character run faster, make a car brake or accelerate, and so on). The majority of game consoles produced by differing companies are nearly identical in their look and feel and functionality.

In contrast, some game consoles or systems include a different type of user interface by providing a unique controller. In such systems, the game interface may be thought of as lying inside or being provided inside the controller itself because instead of using a joystick to control the game the primary game control is in the controller. The controller contains optical position sensors, accelerometers, gyroscopes, and the like that sense tilting and rotation up and down and left and right, rotation along the main axis, acceleration up and down and left and right, and also acceleration toward and away from the screen or monitor. In many games, there is a need for ability to control more than one game element at a time (such as to target or aim and move a character at the same time). To handle this and other "two-hand situations," a second controller or joystick pod (e.g., an analog unit with a joystick, a controller with its own position sensing components, and so on) may be attached to the main or first controller, and a player interfaces with the game by holding one controller in each hand such that input may be provided with each hand and, in some cases, the position of each hand can be accurately sensed and monitored for use in game play. In recent releases of such games, the controller and the sensing of its position are very fast and accurate, with movements often requiring only a quick flick of the wrist to move a user controlled graphic element from one side of the game display to the other.

The development and release of these new controllers has generated a demand for new video games that utilize the position/gesture-based interface of the video game consoles. The controllers lend themselves to new game-playing paradigms such as active games, including: tennis, with the controller taking the place of a tennis racket; baseball, with the controller taking the place of a bat; and sword fighting, with the controller taking the place of a sword. Video games are now being developed that encourage a cardiovascular workout for the game player with the players actively moving their arms to interact with a game such as boxing.

To date, though, most of the games have been relatively simplistic and have not fully utilized the position sensing technologies to provide interesting and visually exciting games such as games that accurately simulate dancing or that qualitatively score a player's motions as they rhythmically respond to music in a game. Existing video games involving music have been commercially very successful but typically have been limited to a simple scrolling display such as a display that requires a player to dance by moving their feet to a location on a sensing pad or moving their fingers to simulate guitar play in time to icons or cue elements scrolled from the top to the bottom of the display. Some music games specifically designed for the new controllers have also used one-way scrolling icons to prompt the player to perform a motion on a particular beat of playing music. While allowing for some fun moves such as clapping the controllers together, the use of one-way scrolling icons does not facilitate a very wide variety of player motions or support varying skill or challenge levels. In one dancing game, iconic prompts horizontally scroll sequentially inward from the left or from the right side of the screen to prompt the player to swing their controller left or right, but again the motions are relatively limited in variety and difficulty. Other video games provide on-screen prompts but often use small portions of the screen to cue the player to take an action, such as a small on-screen prompt in the upper right corner that indicates a player should shake their controller or take other actions to interact with the game.

Hence, there remains a need for new video games for video game consoles or systems that utilize one or more handheld controllers adapted for position, gesture, and/or motion sensing of the controllers. Preferably, such video games would be designed to provide an enhanced simulation of dancing, score the player's movement as he or she rhythmically responds to music playing in the game, and allow differing skill levels to be introduced to challenge the players.

SUMMARY OF THE INVENTION

In one embodiment, aspects of the invention are implemented in a dance game program or application stored in memory such as an optical disk or game cartridge (e.g., a computer-readable storage medium). The computer-readable storage medium includes a dance game application stored therein that is configured to cause a computer (e.g., a processor or processors of a video game console) to implement a video dance game or game method. The method includes displaying on a display screen a heads up display (HUD) including a ring defined by two or more cue target elements or ring segments that are positioned in different zones of the HUD ring. The method further includes playing a song by processing an audio file retrieved from the storage medium and then displaying a plurality of cue elements according to a cue pattern associated with the playing song. Each of the cue elements is typically generated at the center of the ring and caused to travel or move outward from the ring center toward one of the target elements. Each of the cue elements is associated with one of the controllers and is configured (e.g., through coloring, shape, or the like) to visually indicate to a player the corresponding controller.

During game play, the pattern is configured such that at least some of the time the cue elements travel in differing directions. At other times, the pattern may call for some of the differing controller cue elements (right and left hand cues) to be paired and travel concurrently or together from the ring center toward one of the target elements (e.g., to cue the player to move both their hands in a particular direction). In some embodiments, the ring is defined by six or more of the cue target elements or ring segments that are positioned end-to-end (abutting or spaced apart) along the periphery of the dance ring. The zones in such a case may be an up left zone, a left side zone, a left down zone, a right down zone, a right side zone, and an up right zone. The method may further include sensing movement of the controllers, comparing the sensed movements with the cue pattern of the cue elements displayed concurrently (or when) the movements are sensed, and then generating a player score based on the comparison (e.g., whether the player performed the dance move as dictated by the moving cues such as moving in a particular zone/direction when a cue element contacted/crossed a cue target or ring segment). The center of the HUD ring may coincide with the center of the display screen, and background animation, including a player character moving with the playing song, may be displayed beneath or in the background of the HUD ring. The cue elements may all call for a single movement, such as a flick of the player's wrist in a particular direction (e.g., to provide multi-directional game control) or some of the cue elements may call for other actions, such as to move and then hold a position (or to take action such as to press a trigger or button on the moved controller).

DETAILED DESCRIPTION OF THE PREFERRED EMBODIMENTS

Briefly, embodiments of the present invention are directed toward dance video games for game systems that include position/motion sensing controllers, and the dance game includes a dance ring heads up display (HUD) that has overlaid background animation. The dance ring HUD is divided into two or more zones or segments, and a cue target (or ring segment) is provided about the periphery of the ring in each zone/segment. In one embodiment, six zones and six cue targets (e.g., arched bars or the like) are provided to define a dance ring. The player selects a song to dance to, and the video game program provides dance cues in a pattern or sequence associated with that song, with the cues issuing from the center of the dance ring (and display screen) outward toward the target elements (or periphery of the ring). The player wins by moving one or more handheld controllers in the direction of the moving cue in time, or rhythmically, with the music (e.g., as the cue element contacts or is in contact with the target element). The cue elements may include flick or quick movement cues (e.g., balls) or flick and hold cues (e.g., rectangular bars with or without curved ends that indicate the player should hold down an input button/trigger and/or hold their hand in the particular position that can be sensed by the controller). The following discussion begins with a detailed discussion of the video game and play according to the game with reference to screen shots of game play and game processes/methods. The discussion then provides a description of game systems that may be used to execute/implement the dance ring video games of the invention.

Figure 1:
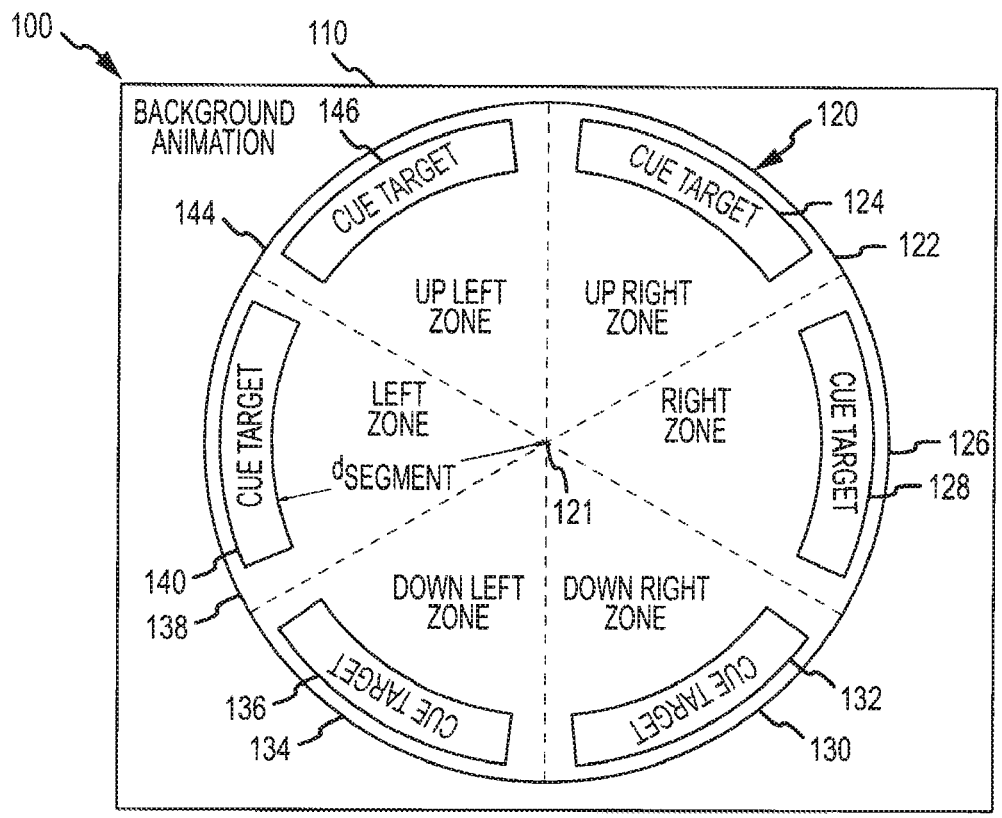
FIGS. 1-4 illustrate screen shots of user interfaces provided during operation of a game on a video game console or other electronic device when the game is loaded and run on the game console or electronic device to initiate a dance ring game.

FIG. 1 illustrates a mapping of a game display 100 that may be utilized by a dance ring game application. As shown, the display 100 may be separated into two main parts, including a background/environment animation section 110 and a dance ring HUD 120 section. The background animation 110 may include other or non-player dancers and atmosphere elements such as a disco ball, flashing lights, and so on. The background animation 110 may also include a display of the player's character (e.g., a Mii in a Nintendo's Wii implementation), and the player's character may be animated to move rhythmically with the playing song/music (e.g., to indicate the "perfect" moves being directed by the cues in the dance ring HUD 120) or to move at least in part in response to player input provided by movement of the controllers. For example, the legs and body of the character may move rhythmically with music while the arms and hands move in response to sensed/determined controller positioning/movement by the game console. The player's character (not shown in FIG. 1) may be displayed directly behind the HUD 120 so as to focus the player's eyes on the HUD 120 and concurrently on their dancing character, or the character may be provided as part of the background animation 110 in a variety of positions on the display 100.

The dance ring HUD 120 is configured to allow a player's eyes to focus on the central portion of the display 100 and, hence, the center 121 typically is aligned with the center point of the display 120. The dance ring HUD 120 is also configured to allow multi-directional cuing. To this end, the ring 120 is divided into multiple zones or segments with six zones being shown in display 100, but other numbers of zones may be used. As shown, an up left zone 144, an up right zone 122, a right side zone 126, a down right zone 130, a down left zone 134, and a left side zone 138 are utilized. The zones are generally shown to be triangular or wedge shaped, but other shapes may be utilized. Also, the zones are shown to be substantially equal in size, but size may also be varied from zone to zone to meet the needs of particular applications. The size/shape of each zone is generally defined by the cue target elements or ring segments 124, 128, 132, 136, 140, and 146 that are provided about the periphery of the ring 120 (e.g., arched bars that may be spaced apart, as shown, or abutting and provided along the circumference of ring 120). The size and shape of each ring zone/segment (and the corresponding dance ring 120) is also defined by the segment spacing, $d_{segment}$, that is a measure of the distance from the center 121 of the ring 120 to the cue target in each zone, with shorter distances also making a dance move more difficult as the player has less time to react as a cue leaves the center 121. With the use of the dance ring HUD 120, player motions can be puppeted (e.g., the cue pattern acts as the puppet master of the player) or controlled in any direction or in a 360-degree manner relative to the center 121 of the ring by visual cues emanating from the center 121 and traveling outward to the targets/segments 124, 128, 132, 136, 140, and 146 as explained below.

Figure 2:
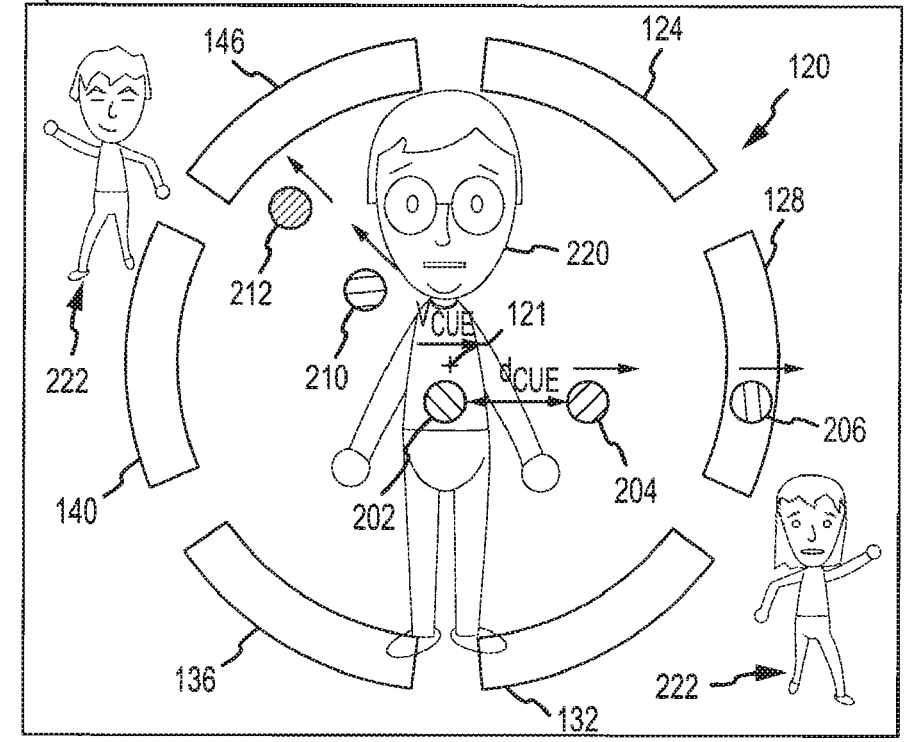

FIG. 2 illustrates a screenshot 200 of a video game display (as may be provided on the screen of a TV or monitor connected to a video game console) when a dance ring video game application is executed/run by a processor of a game console. As shown, the display includes the cue targets 124, 128, 132, 136, 140, and 146 that act together to define a dance ring 120, with the zones not being animated/displayed but instead used to map the game play/dance motions by a game designer. However, some embodiments may animate these zones such as by coloring, lighting, or the like to provide and/or highlight an active zone with moving cue elements. During game play, music based on an audio file provided as part of the game is played by audio signals being output to game system speakers (or an audio output port). Along with the music, a sequence or pattern of visual cues is provided in the ring HUD 120 to indicate to a player to move the controller (and their hands) in a particular direction and/or take other actions such as holding a position or pressing a trigger/input button on the controller.

As shown in FIG. 2, a set of visual cue elements 202, 204, 206 are generated by the game application and emanate from the center 121 and travel outward. In this example, the set of cue elements 202, 204, 206 are colored (as indicated by a crosshatch pattern) to indicate to the player that these cues are for a particular controller and/or hand (e.g., for the main controller that typically is held in a player's right hand). The cue elements 202, 204, 206 are moving within the right side zone 126 toward the cue target 128 at a particular velocity, $v_{cue}$, and with a particular cue spacing, $d_{cue}$. Typically, the player is expected to move their controller to the right (such as with a flick of the worst with a return to center or "neutral") as the cue crosses the target element such as shown for cue element 206 and target element or segment 128 in FIG. 2, and the game application may score the player's dancing based on the timing of the movement of their hands and the controllers held in those hands.

The cue spacing, $d_{cue}$, and cue velocity, $v_{cue}$, from the center 121 can be varied such as based on the game or song skill level to vary the difficulty and/or game experience (e.g., with higher velocities, smaller cue spacing, and/or smaller segment spacing making the game more difficult). Concurrently and/or sequentially, cue elements 210, 212 that are associated with the other hand/controller (e.g., the joystick or Nunchuk), colored/shaped or otherwise designed to indicate such association, move (typically at the same velocity as main controller cues 202, 204, 206 or at a differing speed to increase game play difficulty) in a different direction from the center 121 (e.g., toward target element 146 or into the upper left zone). Again, the cue spacing and cue velocity are typically the same for both hands/controllers, but these may differ to increase difficulty or to provide a cue pattern that better matches the rhythm of the playing song (e.g., define a dance that suits the music/song). As the music plays, the cues for each controller may emanate from the center 121 in nearly any pattern and, significantly, in two or more (e.g., up to 6 or more) directions to create multi-directional body movements to simulate dancing to music.

The display 200 may include background animation including the animated player's character (or Mii in the Nintendo's Wii implementation) 220, and this character 220 typically is positioned underneath the dance ring 120 to allow the user/player to focus on both elements 120, 220. The character 220 may be animated dancing to the playing song, performing the moves indicated by the cue elements (e.g., the game's or song's dance cue pattern), and/or moving in response the player's movement of the controllers. The background animation may include other features such as other dancing characters 222 that, again, typically dance or move in rhythm to the song playing as part of the dance ring game.

Figure 3:
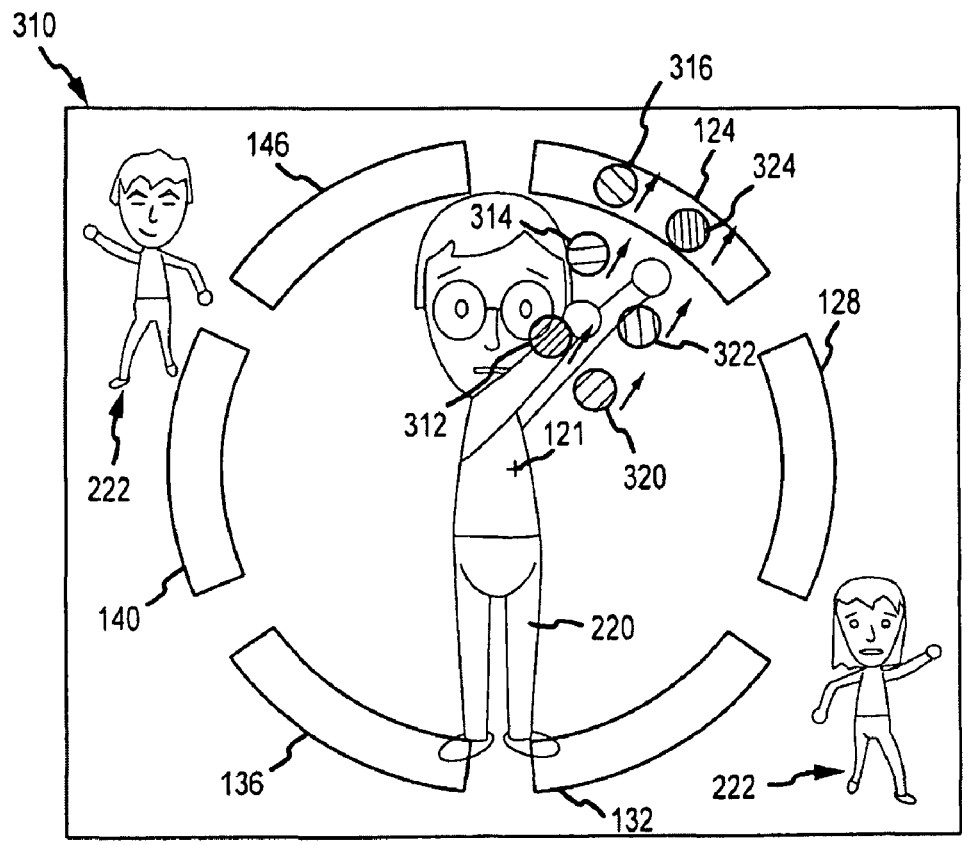

The variety of cue patterns that may be used in a dance ring game are very large and are generally only limited by the imagination of the game designer. For example, FIG. 3 illustrates a screen shot 310 of another dance ring game display in which a player's character 220 is again dancing to a song with background dancers 222. In this screen shot, though, the player is being asked through the cue pattern to move their hands concurrently and in the same way (e.g., to the same zone/segment of the ring (e.g., zone 122 shown in FIG. 1) at the same pace/rhythm, and so on). This is achieved by including a cue pattern with a section where cue elements 312, 314, 316 for a first hand/controller are paired with a like number of cue elements 320, 322, 324 for a second hand/controller. The pairs of cue elements travel outward from the ring center 121 in a common direction and zone toward the target element 124. In this example, the player is successful when they move both hands/controllers concurrently (or nearly so) in the upper right direction as each pair of cue elements contacts/crosses the target element 124. In a dance video game, the concurrent hand/controller cues may be sequentially combined with other such cues such as to move both of the player's hands/controllers in differing directions (or into differing zones) or with single hand/controller cues. For example, the patterns shown in FIG. 2 may be followed by the pattern shown in FIG. 3 or vice versa.

Figure 4:
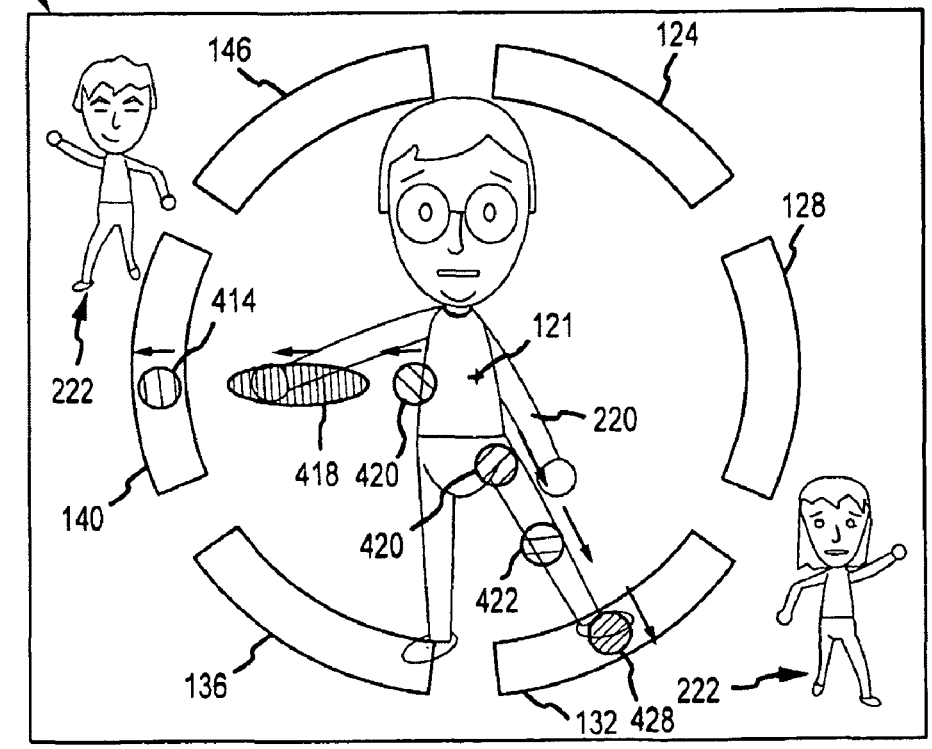

In addition to single, quick moves or wrist flicks, it may be desirable to cause the player to take other actions as part of the game play. For example, it may be desirable for a player to hold a position with or without also providing input (e.g., pulling a trigger, pressing a button, and so on) via the held controller. FIG. 4 illustrates a cue pattern that includes a single or flick move cue 414 provided for a first controller/hand followed in sequence by a hold cue 418, with both cue elements traveling from the center 121 in the same direction toward the left side target element 440. In this case, the player is successful when they first flick their wrist toward the left with cue 414 contacting target element 140 and then flicking/moving their wrist to the left and holding this position for a period of time (e.g., while the hold cue 418 is still contacting the element 140 or some other preset hold period). The cue pattern may of display 410 may also include cue elements 420, 422, 428 associated with the other hand/controller as indicated in this case by their differing crosshatching, which is intended to indicate a differing color. The player taking these visual cues 420, 422, 428 is successful by moving the hand holding the second controller at least partially concurrently with the other hand/controller in a different direction as the cues contact the target 132 as shown with cue 428 (e.g., move this hand/controller down and to the right). As will be appreciated from these three relatively simple cue patterns, the variety of cue patterns that may be associated with a particular song are nearly limitless. Further, in addition, to holding a position, the player may be cued to take other action with differing cues with the invention not being limited to the two moves of flicking or moving the wrist and moving and then holding a position.

As noted above, the cuing may be enhanced by having the cue elements change as they travel from the center 121 to the target elements about a dance ring (e.g., the dance ring 120 shown in FIG. 1). For example, the cue elements may be transparent or nearly so as they first are generated near the center 121 and then become more fully animated (brighter or thicker lines or the like) as they approach the targets. In other cases, the cues may be otherwise changed to indicate that they are nearing the target elements and a dance move is expected such as by flashing, changing size or shape, or changing color.

Figure 5:
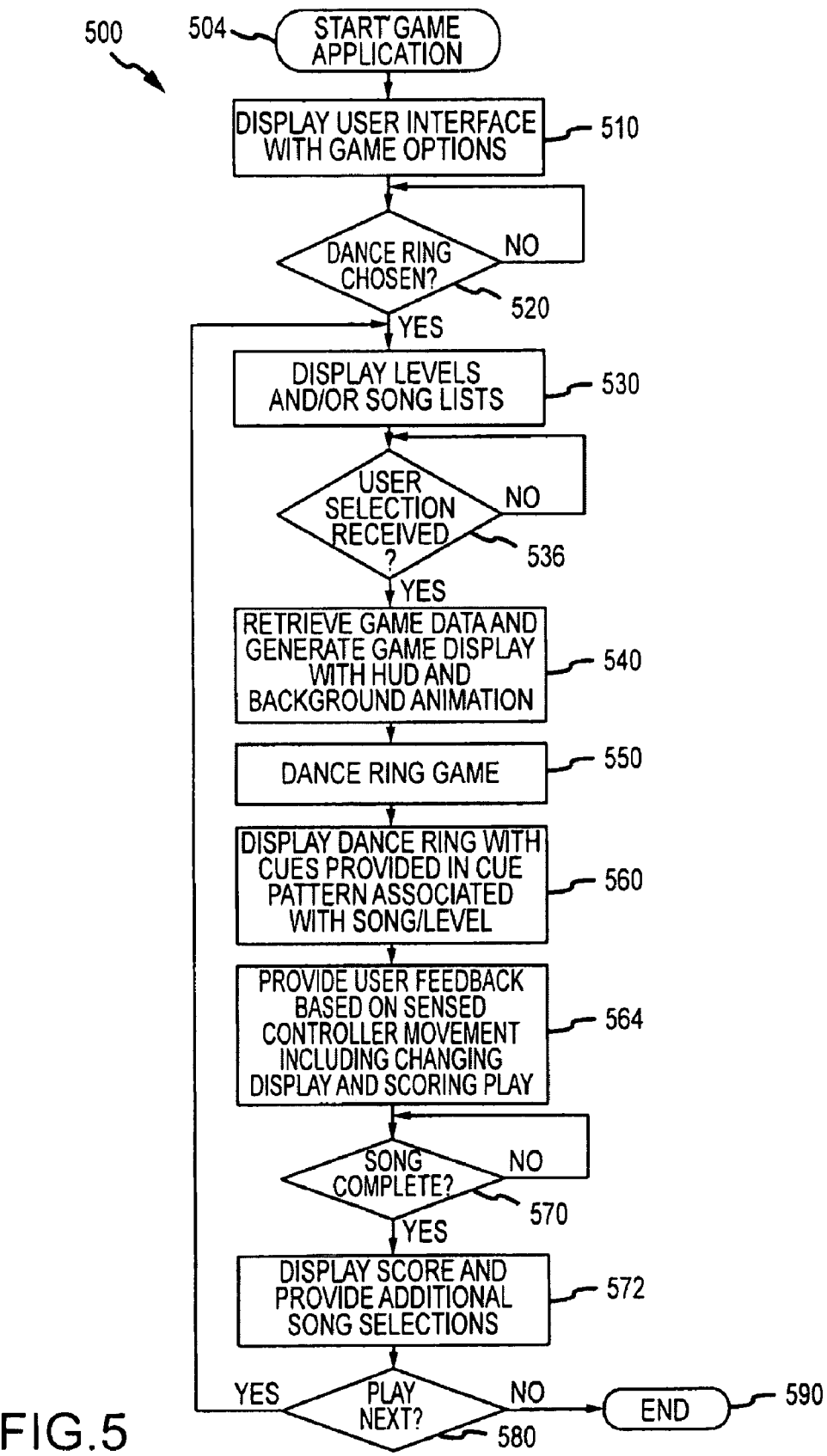
FIG. 5 illustrates a flow process for operating a video game system in accordance with an embodiment of the invention.

FIG. 5 illustrates a dance video game or game play method 500 provided when a video console or other processor executes or runs dance video game application or program in accordance with the present invention. As shown, the method 500 begins at 504 such as with a game disk or storage media being loaded into a video game console and the dance ring game application being loaded and run. At 510, the method 500 continues with displaying a user interface on a game monitor (e.g., a TV or computer screen), and the game interface may include a menu of the dance ring game including game options, with one being to play a dance ring game. At 520, the method 500 continues with a user/player providing input indicating selection of the dance ring game.

At 530, the method 500 includes displaying skill levels and/or song lists for the player to choose (or in some embodiments, the game will cause the player to sequentially or randomly work through songs on a particular level prior to moving to a next level). At 536, a user selection of a song and/or skill level is received from the user (e.g., the same songs may be provided but with differing dance cue patterns based on how hard the player wants the game to be or how hard they have "earned" by prior play). At 540, game data including an audio file with the selected music/song and a cue or dance pattern for the chosen (or next) song and/or skill level is retrieved from memory on the game disc (or from game memory such as may be provided in the console or from an inserted game card/cartridge or the like). Step 540 also includes generating a game display on the game system monitor, and such a display includes a dance ring HUD and background animation as discussed above. At 550, the method 500 includes initiating the dance ring game such as by playing music from the audio file and displaying dancing background characters and/or a player's character and the current score (and/or other game data such as the player's chosen character name).

At 560, the dance ring HUD is displayed with cue elements shown in the game display according to a cue pattern associated with the song (and, in some cases, the skill or difficulty level associated with the song chosen/earned by the player). In some embodiments, the method 500 also includes a step 564 in which user feedback is provided to the player via visual displays and/or audio outputs. The user or player feedback is determined based upon the sensed controller movements/positions during the display of the cue pattern in the dance ring HUD (i.e., steps 560 and 564 include motion and/or position detection for the controllers to determine if the cued moves and/or actions are properly performed, such as movement in the correct direction and also at the right time). The feedback may include scoring the player's dancing or moves and providing an ongoing current score. The feedback may also include causing the controller(s) to vibrate when a move or number of moves are missed. In some cases, audio and/or visual feedback is provided, such as a cheering crowd when a series of moves are properly performed. At 570, the method 500 includes monitoring for completion of the song (or a player quitting mid-song), and when detected, the method 500 may end at 590 or first include displaying the player's score and a listing of next actions including a list of additional songs/dances 572 that may be played. At 580, the method 500 includes determining whether the user via their controller has selected an additional/next song, and if so, the method 500 continues at 530. Otherwise, the method 500 ends at 590. In some cases, the game may be ended 590 before the end of the song such as after so many mistakes or missed moves by the player.

Figure 6:
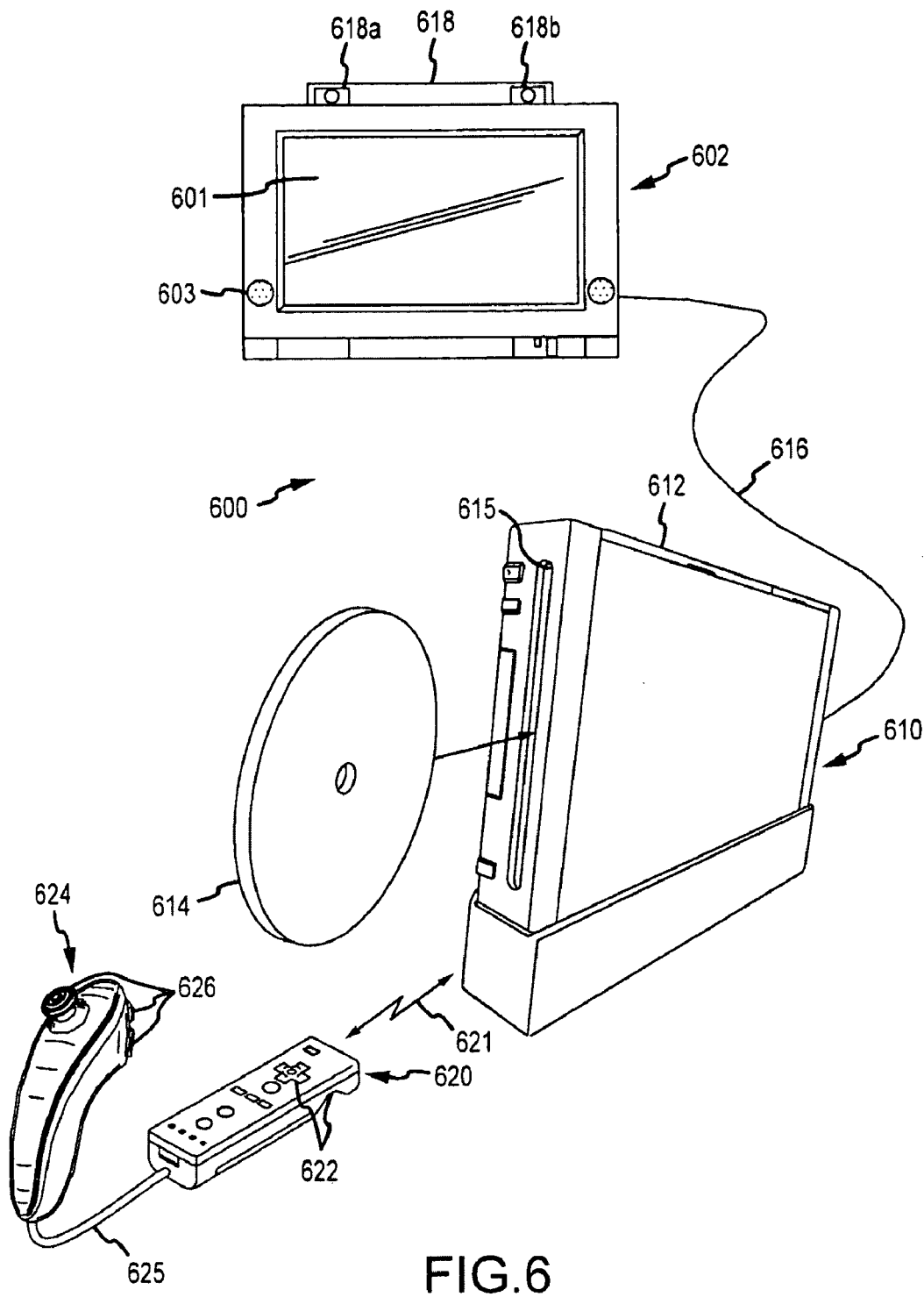
FIG. 6 illustrates a video game system (or interactive computer graphics system in the form of a home video game apparatus for executing a game program) according to an embodiment of the invention.

FIG. 6 illustrates a video game system 600 of an embodiment of the invention that includes a disc or other data storage media 614 storing a dance ring video game executable by the game system 600. As shown, the system 600 includes a video game console 610, a monitor or display device (such as a television) 602, and controllers 620, 624 (e.g., which may be adapted for sensing 3D positioning, gesturing, and acceleration as discussed in the background of this application). Game console 600 executes a game program or other application stored on optical disc (or other data storage media) 614 inserted into slot 615 formed in console housing 610. For example, the game program may be a dance ring video game as described herein, and the memory of the game disc 614 may further store game data such as songs in digital format and cue patterns associated with such songs along with other game information useful for game play (e.g., scoring parameters for successfully following a dance pattern, noises or other effects (e.g., vibrating a controller) for moving (or failing to move) as visually cued with the music, and the like). The result of the execution of the game program or other application is displayed on display 601 of television or monitor 602 to which game console 610 is connected by cable 616. Audio associated with the game program or other application is output via speakers 609 of television or monitor 602. While an optical disk 614 is shown in FIG. 6 for use in storing video game software, the game program or other application may alternatively or additionally be stored on other storage media such as semiconductor memories, magneto-optical memories, magnetic memories and the like and/or downloaded over a network, stored in memory of console 610, provided in a game cartridge inserted to a connector port, or by other means.

Controller 620 (e.g., a main controller or first/right hand controller) wirelessly transmits data such as game control data to the game console 600 as shown via wireless signals/communications 621. The game control data may be generated using an operation section 622 of controller 620 having, for example, a plurality of operation buttons, a key, a stick and the like. Controller 620 may also wirelessly receive data transmitted from game console 610 via wireless signals/communications 621. Any one of various wireless protocols may be used for the wireless transmissions 621 between controller 620 and game console 610. Controller 624 (e.g., a secondary or joystick controller/pod, Nunchuk, second/left hand controller) is provided to allow two hand or multi-functional control (e.g., to allow a player to move both hands with the position of each hand sensed/determined by system 600, to allow a user to provide two types of input, and so on), and a cable 625 is provided to allow the controller 624 to provide input via input/operation section 626 (which may include a joystick and buttons as shown) to the main controller 620 and then to console 610 via signals 621 (e.g., in some cases, the controller is an analog unit).

Controller 620 (and in some cases controller 624) also includes an imaging information calculation section for capturing and processing images from light-emitting devices 618a and 618b in a separate sensor or control strip 618 typically positioned above the center of the monitor screen 601. Particularly, a center point between light-emitting devices 618a and 618b is aligned with a vertical centerline of television 601. The images from light-emitting devices 618a and 618b can be used to determine a direction in which controller 620 is pointing as well as a distance of controller 620 from sensor bar 618. By way of example without limitation, light-emitting devices 618a and 618b may be implemented as two infrared LED modules (hereinafter, referred to as "markers") provided in the vicinity of a display screen 601 of television/monitor 602. The markers each output infrared light, and the imaging information calculation section of controller 620 detects the light output from the LED modules to determine the direction in which controller 620 is pointing and the distance of controller 620 from sensor bar 118. Although markers 618a and 618b are shown in FIG. 6 as being above television/monitor 602, they may also be positioned below television 602 or in other configurations/locations based on programmed code in game application of media 614 and/or controller 620. In some embodiments, the controllers 620, 624 are adapted to sense tilting and rotation up/down and left/right, rotation along the main axis of their housings, and acceleration (such as up/down, left/right, and toward/away the screen 601) and provide this information in wireless communications/signals 621 to a dance game on disc 614 executed by or run by video game console 610. In this manner, a player may hold one of the controllers 620, 624 in each of their hands and provide input by flicking their wrists or otherwise moving the controllers 620, 624 in a particular direction and, in some cases, then "holding" by not moving for a period of time or by selecting a trigger or other button in input/operation portion 622, 626.

Figure 7:
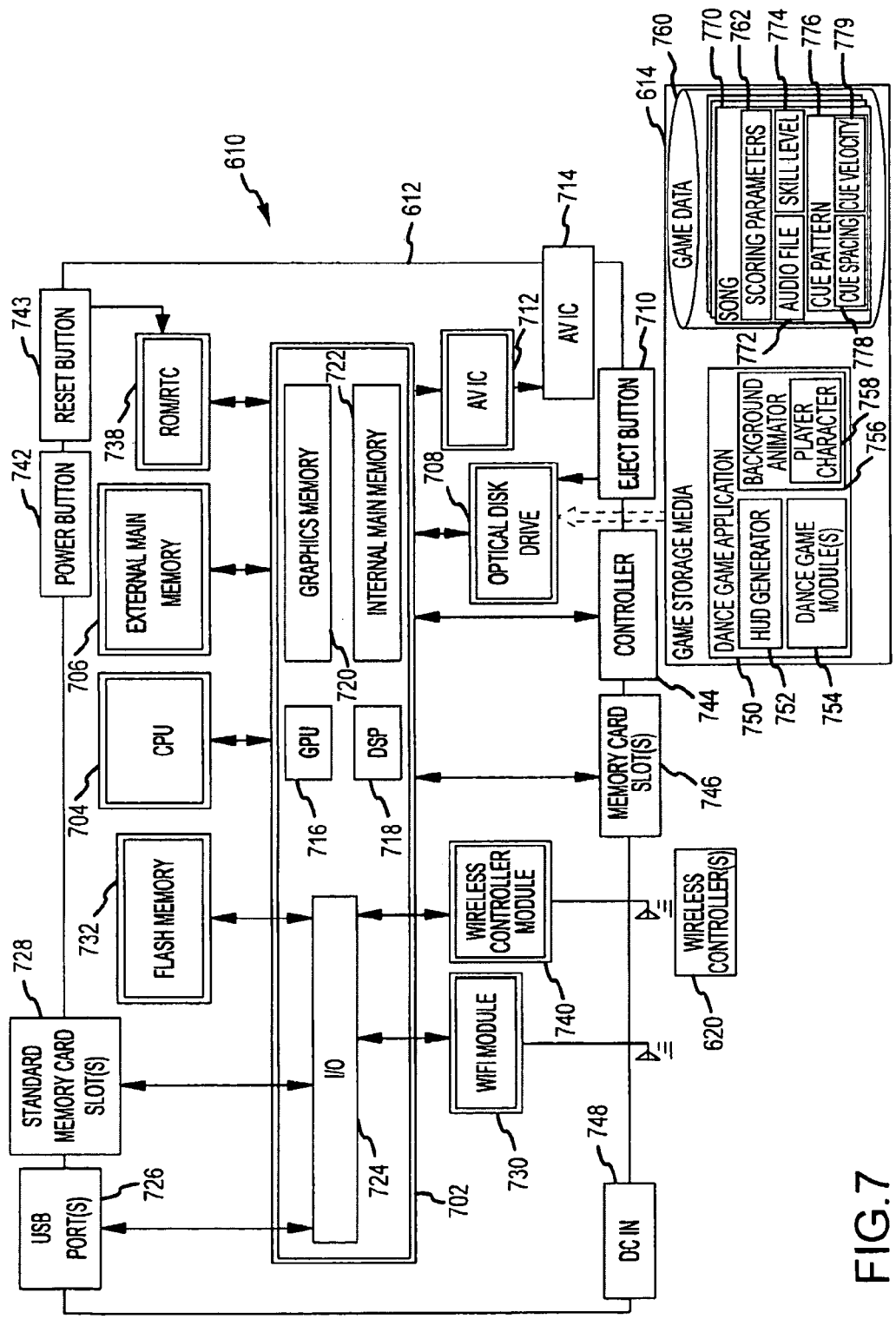
FIG. 7 illustrates in functional block form a video game console, such as the console shown in FIG. 6.

FIG. 7 shows one useful but not limiting implementation of the game console 610 of FIG. 6. It includes a central processing unit (CPU) 704 (such as an RISC CPU or, other processor) for executing various types of applications including video game programs such as dance game application 750 provided on game storage media 614 (e.g., an optical disc, a game or memory card/cartridge, or the like). CPU 704 may execute a boot program stored in a boot ROM 738 to initialize game console 610 and then execute an application 750 stored on optical disc 614, which is inserted into optical disk drive 708. User-accessible eject button 710 provided on housing 712 of game console 710 may be used to eject an optical disk 614 from disk drive 708.

The game storage media (disk or the like) 614 includes a dance game application or program 750 (e.g., software or programming code with instructions executable by the CPU 704 providing a video game including animating a dance ring, background animation, and scoring while playing music/audio files). The dance game application 750 includes a HUD generator 752 for generating/animating the dance ring display on a monitor such as a TV or computer/electronic device screen. Dance game modules 754 are provided to implement some of the game functionality such as playing songs, scoring a player's moves to a cue pattern, and so on. The game application 750 also includes a background animation module 756 for generating game environment such as other dancers and background scenes (e.g., dance party scenery, a disco, and the like) and may include the player character generator (e.g., animation routines for generating an avatar designed by the player or a Mii/character selected by the player and so on).

The game disc 614 also includes in memory game data 760 used by the game application 750 to provide the dance ring game during operation of the console 610. For example, the game data 760 may include scoring parameters 762 used by the game modules 754 in determining a score for a player's movements and actions during a dance game and may also include effects/responses for successful and unsuccessful play (e.g., cause controller to vibrate when a move is missed, make cheering sounds upon completion of a series of moves, cause portions of the display to flash or change color based on game play, and so on). The game data 760 may be arranged in some embodiments by songs that can be selected by a player via a displayed user interface as shown with songs 770. Associated with each selectable song (or game portion) an audio file 772 may be provided in memory or on disc 614 including music or a song stored in a digital form.

Associated with the music of audio file 772 may be a skill level 774, and based on such a skill level, a cue pattern 776 may be provided for each song 770. For example, at lower skill levels 774, the cue pattern 776 may be designed to provide relatively simple movements of a controller 620, with slower moving cues, greater cue spacing, and sequential hand/controller movement. At higher skill levels 774, cue pattern 776 may likewise be designed to provide increasingly complex movements of a controller 620, such as with concurrent hand/controller cues, smaller cue spacing, smaller target element spacing from the ring center, and other parameter settings that can make a dance more difficult to perform. The cue pattern 776 defines a dance to be performed by a player with the audio file 772, and it may include definition of a variety of parameters/variables such as cue spacing 778, cue velocity 779, as well as the sequence and timing of generated cues (and whether the cues are flick cues or flick and hold movements).

In the illustrated console 710, CPU 704 is connected to subsystem 702 that includes graphics processing unit (GPU) 716 with an associated graphics memory 720, audio digital signal processor (DSP) 718, internal main memory 722, and input/output (IO) processor 724. I/O processor 724 of subsystem 702 is connected to one or more USB ports 726, one or more standard memory card slots (connectors) 728, WiFi module 730, flash memory 732, and wireless controller module 740 (which in turn is in communication with controller 620). USB ports 726 are used to connect a wide variety of external devices to game console 610. These external devices include game controllers, keyboards, storage devices such as external hard-disk drives, printers, digital cameras, and the like. USB ports 726 may also be used for wired network (e.g., LAN) connections with one example implementation including two USB ports 726. Standard memory card slots (connectors) 728 are adapted to receive industry-standard-type memory cards (e.g., SD memory cards). In one example implementation, one memory card slot 728 is provided. These memory cards are generally used as data carriers. For example, a player may store game data (e.g., data 760) for a particular game on a memory card and bring the memory card to a friend's house to play the game on the friend's game console. The memory cards may also be used to transfer data between the game console 610 and personal computers, digital cameras, and the like.

WiFi module 730 enables game console 610 to be connected to a wireless access point. The access point may provide internet connectivity for on-line gaming with players at other locations (with or without voice chat capabilities), web browsing, e-mail, file downloads (including game downloads) and many other types of on-line activities. In some implementations, WiFi module 730 may also be used for communication with other game devices such as suitably-equipped hand-held game devices. Module 730 is referred to herein as "WiFi", which is generally used in connection with the family of IEEE 802.11 specifications. However, game console 610 may alternatively or additionally use wireless modules that conform with other wireless standards as well as proprietary or non-standard protocols. Flash memory 732 stores, by way of example without limitation, game save data, system files, internal applications for the console, and downloaded data (such as games).

Wireless controller module 740 receives signals wirelessly transmitted from one or more controllers 620 and provides these received signals to I/O processor 724. The signals transmitted by controller 620 to wireless controller module 740 may include signals generated by controller 620 itself as well as by other devices that may be connected to controller 620. By way of example, some games may utilize separate right- and left-hand inputs. For such games, another controller 624 shown in FIG. 6 may be connected to controller 620, and controller 620 may transmit to wireless controller module 740 signals generated by itself and by the other controller 624. Wireless controller module 740 may also wirelessly transmit signals to controller 620. Controller 620 (and/or another game controller 624 for example connected thereto) may be provided with vibration circuitry, and vibration circuitry control signals based on game data 760 and/or game application 750 configuration may be sent via wireless controller module 740 to control the vibration circuitry. Controller 620 may be provided with or be connected to a speaker, and audio signals for output from this speaker may be wirelessly communicated to controller 620 via wireless controller module 740. By way of still further example, controller 620 may be provided with or be connected to a display device (not shown), and display signals for output from this display device may be wirelessly communicated to controller 620 via wireless controller module 740.

Memory card slots 746 may be adapted to receive proprietary memory cards. In one example implementation, two such slots are provided. These proprietary memory cards have some non-standard features such as a non-standard connector or a non-standard memory architecture. In an example implementation, memory card slots 746 may be used for read-only access to the memory cards inserted therein, and limitations may be placed on whether data on these memory cards can be copied or transferred to other storage media such as standard memory cards inserted into slots 728.

One or more controller connectors 744 are adapted for wired connection to respective game controllers. In one example implementation, four such connectors are provided for wired connection to game controllers. Alternatively, connectors 744 may be connected to respective wireless receivers that receive signals from wireless game controllers. Among other things that they do, these connectors enable players to use controllers for a particular gaming platform when an optical disk for a game developed for this platform is inserted into optical disk drive 708.

A DC connector 748 is provided for connecting game console 610 to a DC power source. GPU 716 performs image processing based on instructions from CPU 704. GPU 716 includes, for example, circuitry for performing calculations necessary for displaying three-dimensional (3D) graphics. GPU 716 performs image processing using graphics memory 720, which is dedicated for image processing and a part of internal main memory 722. GPU 716 generates image data for output to television/monitor 602 (of FIG. 6) by audio/video connector 714 via audio/video IC (interface) 712. Audio DSP 718 performs audio processing based on instructions from CPU 704. The audio generated by audio DSP 718 is output to television/monitor 602 by audio/video connector 714 via audio/video IC 712. External main memory 706 and internal main memory 722 are storage areas directly accessible by CPU 704. For example, these memories can store an application program, such as a game program read from optical disc 614 by the CPU 704, various types of data, or the like. ROM/RTC 738 includes a real-time clock and preferably runs off of an internal battery (not shown) so as to be usable even if no external power is supplied. ROM/RTC 738 also may include a boot ROM and SRAM usable by the console. Power button 742 is used to power game console 610 on and off. In one example implementation, power button 242 must be depressed for a specified time (e.g., one or two seconds) to turn the consoled off so as to reduce the possibility of inadvertent turn-off. Reset button 743 is used to reset (reboot) game console 610.

Figure 8:
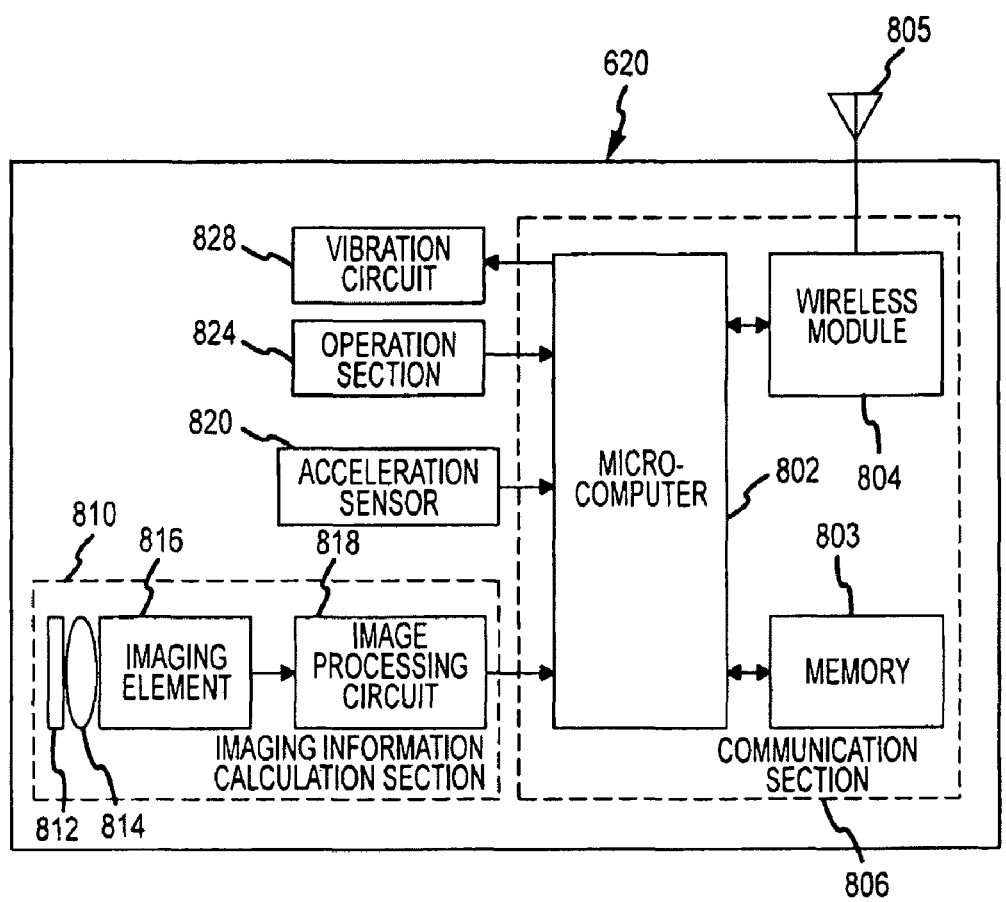
FIG. 8 illustrates a block diagram of a controller of the game systems of FIGS. 6 and 7.

As shown in the block diagram of FIG. 8, controller 620 may be implemented to include a three-axis, linear acceleration sensor 820 that detects linear acceleration in three directions, i.e., the up/down direction (e.g., the Z-axis), the left/right direction (e.g., the X-axis), and the forward/backward direction (e.g., the Y-axis). Alternatively, a two-axis linear accelerometer that only detects linear acceleration along each of the Y-axis and Z-axis may be used, or a one-axis linear accelerometer that only detects linear acceleration along the Z-axis may be used. Generally, the accelerometer arrangement (e.g., three-axis or two-axis) depends on the type of control signals desired. The three-axis or two-axis linear accelerometer may be of the type available from Analog Devices, Inc. or STMicroelectronics N.V. In some cases, acceleration or controller motion sensor 820 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 820.

Linear accelerometers, as used in acceleration sensor 820, are only capable of detecting acceleration along a straight line corresponding to each axis of the acceleration sensor. In other words, the direct output of acceleration sensor 820 is typically limited to signals indicative of linear acceleration (static or dynamic) along each of the two or three axes thereof. As a result, acceleration sensor 820 may not directly detect movement along a non-linear (e.g. arcuate) path, or of a rotation, rotational movement, angular displacement, tilt, position, attitude or any other physical characteristic.

However, through additional processing of the linear acceleration signals output from acceleration sensor 820, additional information relating to controller 620 can be inferred or calculated or otherwise determined. For example, by detecting static, linear acceleration (i.e., gravity), the linear acceleration output of acceleration sensor 820 can be used to determine tilt of the object relative to the gravity vector by correlating tilt angles with detected linear acceleration. In this way, acceleration sensor 820 can be used in combination with microcomputer 802 of controller 620 (or another processor) to determine tilt, attitude, or position of controller 620 (e.g., position and/or gesture information of controller 620). Similarly, various movements and/or positions of controller 620 can be calculated through processing of the linear acceleration signals generated by acceleration sensor 820 when controller 620 containing acceleration sensor 820 is subjected to dynamic accelerations by, for example, the hand of a user/player. In another embodiment, acceleration sensor 820 may include an embedded signal processor or other type of dedicated processor for performing any desired processing of the acceleration signals output from the accelerometers therein prior to outputting signals to microcomputer 802. For example, the embedded or dedicated processor could convert the detected acceleration signal to a corresponding tilt angle or other desired parameter when the acceleration sensor is intended to detect static acceleration, i.e., gravity.

Returning to FIG. 8, imaging information calculation section 810 of controller 620 includes infrared filter 812, lens 814, imaging element 816, and image processing circuit 818.

Infrared filter 812 allows infrared light from the light that is incident on the front surface of controller 620 to pass through. Lens 814 collects and focuses the infrared light from infrared filter 812 on imaging element 816. Imaging element 816 may be a solid-state imaging device such as, for example, a CMOS sensor or a CCD. Imaging element 816 captures images of the infrared light from markers 618a and 618b (shown in FIG. 6) collected by lens 814. Accordingly, imaging element 816 captures images of the infrared light that has passed through infrared filter 812 and generates image data based thereon. This image data is processed by image processing circuit 818, which detects an area thereof having high brightness, and based on this detecting, outputs processing result data representing the detected coordinate position and size of the area to communication section 806. From this information, the direction in which controller 620 is pointing and the distance of controller 620 from display screen 601 (or, more accurately, from sensor strip 618) can be determined.

Vibration circuit 828 may also be included in controller 620. Vibration circuit 828 may be, for example, a vibration motor or a solenoid. Controller 620 is vibrated by actuation of the vibration circuit 828 (e.g., in response to signals from game console 610) during execution of a dance ring game application, and the vibration is conveyed to the hand of the player holding controller 620. Hence, a so-called vibration-responsive game may be realized. As described above, acceleration sensor 320 detects and outputs the acceleration in the form of components of three axial directions of controller 620, i.e., the components of the up-down direction (Z-axis direction), the left-right direction (X-axis direction), and the front-rear direction (the Y-axis direction) of controller 620. Data representing the acceleration as the components of the three axial directions detected by acceleration sensor 820 is output to communication section 806. Based on the acceleration data that is output from acceleration sensor 820, a motion of controller 620 can be determined by a game console such as console 610 of FIGS. 6 and 7.

Communication section 806 includes microcomputer 802, memory 803, wireless module 804, and antenna 805. Microcomputer 802 controls wireless module 804 for transmitting and receiving data while using memory 803 as a storage area during processing. Microcomputer 802 is supplied with data, including operation signals (e.g., cross-switch, button or key data) from operation section 824, acceleration signals in the three axial directions (X-axis, Y-axis and Z-axis direction acceleration data) from acceleration sensor 820, and processing result data from imaging information calculation section 810. Microcomputer 802 temporarily stores the data supplied thereto in memory 803 as transmission data for transmission to game console 610. The wireless transmission from communication section 806 to game console 610 is performed at a predetermined time interval. At the transmission time, microcomputer 802 outputs the transmission data stored in memory 803 to wireless module 804. Wireless module 804 sends the stored data from antenna 805 as a carrier wave signal having a specified frequency. In this manner, operation signal data from operation section 824, the X-axis, Y-axis, and Z-axis direction acceleration data from acceleration sensor 820, and the processing result data from imaging information calculation section 810 is transmitted from controller 620. Game console 610 receives the carrier wave signal and demodulates or decodes the carrier wave signal to obtain the operation information (e.g., the operation signal data, the X-axis, Y-axis and Z-axis direction acceleration data, and the processing result data). Based on this received data and the application (e.g., dance ring game application) currently being executed, CPU 704 of game console 610 (shown in FIG. 7) performs application processing. In some cases, controller 620 can also receive data wirelessly transmitted thereto from devices including game console 610.

The system described above can be used to execute software stored on optical disk 614 or in other memory that controls it to interactively generate displays on display 601 of a dance ring game display with background animation and a dance ring HUD overlay with dance cues and dance ring target elements in response to user input provided via controller 620 (and controller 624).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the above description stresses game play with two controllers such that both hands may be cued or directed to move sequentially or concurrently in the same or differing directions. In some embodiments, a single controller may be used to make the game more of a one-hand game (or two hands holding a single controller or one or two hands holding a holder/case supporting two controllers). In some embodiments, additional inputs may be used to provide a more full body or fit game. For example, a balance board, a dance pad, or other device that receives input from the player's feet may be connected to the game console, and in such cases, the dance ring HUD may further include visual cue elements to instruct the player to move their feet side-to-side or in other directions. The feet movements may be simplified such as lifting one or the other or moving simply one to the left or right or vice versa or may be more complicated such as by providing visual cues related to the feet on the same or a differing dance ring HUD.

As can be seen from the above description and the accompanying figures, embodiments of the present invention address some problems associated with prior games and game systems by providing video games (or code and digital data) that can be executed by a video game console (or computer, electronic device with a processor and graphics capability, and the like) to provide a player experience that simulates dancing and also provides qualitative scoring of a player's motions as he or she rhythmically responds to music played during the dance game. The game systems include one or more controller(s) adapted for sensing movement (e.g., change in position or acceleration), gesture (e.g., rotation), and/or positioning of the controllers relative to the game system display screen (e.g., is the controller being moved to the left/right, up/down, or some other angle) and such controllers may be considered position and movement sensing controllers or the like. Implementations of the present invention provide a more natural way of puppeting players' body motions without relying on specific icons to tell them what to do as was the case in some prior games. The dance ring games in accordance with the present invention provide a solution to this problem through a 360-degree representation of the on-screen player's body or player's character.

When run or executed by a processor(s) of a video game console, the dance ring game generates a heads up display (HUD) overlay on the game system monitor (e.g., a television screen, a computer monitor, and the like) that directs player movement, and, in some cases, the player's character, displayed underneath the HUD overlay, is dancing with the music (e.g., making the moves indicated by the HUD overlay). The HUD overlay may be divided into multiple segments, such as two to five in some games, with one preferred embodiment utilizing six distinct segments, including upper left, upper right, middle left, middle right, lower left, and lower right. Other embodiments utilize additional segments such as seven to ten or more. During game play, music is played from an audio file (e.g., music stored in digital format and stored on the game disk, game cartridge, or memory of the console) and cues (or rhythmic cue elements) originate from the center of the screen, which may also be the center of the dance ring and HUD. In some embodiments, the cue elements are animated to range from transparent to opaque, with increased opaqueness occurring as the cues travel from the center of the ring toward the outer perimeter of the dance ring.

The outer perimeter of the dance ring may be defined with a cue target element or ring segment provided for each zone or segment of the dance ring. Hence, in one preferred embodiment, six cue target elements are displayed about the ring perimeter and the cues emanate from the ring center and travel outward toward these cue target elements or ring segments. To play the game successfully, the player holds in his or her right and left hands a main or secondary controller (e.g., a position and movement sensing controller such as may be distributed by game companies such as Nintendo of America Inc. under the names Wiimote and Nunchuk) and swings the controller(s) in the appropriate direction (e.g., upper left when a cue is crossing the upper left segment/zone cue target element or ring segment). The cues are preferably provided in a dance moves pattern that is matched to the playing music/song and configured to cause the cues to cross the ring segments rhythmically or in time with the playing music/song. The cue pattern may include single hand cues (e.g., just move the main controller) but more typically includes two-handed cues (or a cue for both hands) such as with cues of differing colors or shapes being associated with each controller (e.g., one for the Wiimote and one for the Nunchuk or the like). The two hand cues instruct the player to move both hands to the appropriate zone or segment of the dance ring in time with the playing song/music (e.g., to make dance moves directed by the game designer).

With the provision of the dance ring HUD, game designers can create a sequence/pattern of gameplay cues that require the player to move her hands and body in various poses without requiring the player to have an understanding of move-specific iconography. The dance ring HUD also facilitates providing a much smoother challenge ramping process by adjusting parameters such as cue spacing, cue velocity, timing, number, and pattern complexity, which allow for a deeper game experience. The dance ring game, with its unique HUD display and cues emanating in multiple directions from a center point (rather than a simple one direction scrolling action for cues like guitar and other dance games), provides a number of advantages. Ring dance games are intuitive, as the players do not have to memorize any iconography before playing the game, but instead they can simply move their hands with the traveling cue elements to portions or zones of the screen (or ring zones). This is a far more elegant method of providing dance gameplay in game systems with position/movement sensing controllers.

Another advantage in accordance with the present invention is the multiple levels of complexity or game variables/parameters it supports. The dance ring allows for design of very easy and also very challenging levels (e.g., game skill or challenge levels). Earlier dance game levels (with lesser degrees of difficulty and the like) may require only simple motions of the player. More challenge can be provided in higher levels (with higher degrees of difficulty) by varying game parameters such as the distance from the center of the ring to the target element (e.g., ring segment distance), cue spacing, single or two handed cues and whether such cues reach target elements sequentially or concurrently (and whether the two handed cues go to differing target elements or the same target element), timing of cues and their velocity from the center, and varying directions of the cues. These variables can be selected and/or adjusted to define a cue pattern for a song and a particular skill level. Other dance games typically can only manipulate one or two of these variables (e.g., cue spacing and cue velocity but not direction). A further advantage of the HUD is that players can view background action. Other rhythm-based games force players to view a HUD in one section of the screen (often the bottom of the screen), which means that the player can not see the background animations, characters, environments, and effects while they are playing. The dance ring HUD may be centered in the center of the display screen, which focuses the player's eyes squarely on the center of the screen, where both the gameplay elements such as dance cues and the background animations of the game are generated.

We claim:

1. A non-transitory computer-readable storage medium having a video game application stored therein, the game application causing a computer or processor of a video game system, which includes a display screen, and first and second handheld controllers adapted for sensing movement and positioning of the controllers relative to the display, to implement a method comprising:
   on the display screen, displaying a heads up display (HUD) comprising a ring with defined by at least two cue target elements positioned in differing zones of the HUD ring;
   playing a song by processing an audio file retrieved from the storage medium; and
   displaying a plurality of cue elements in a pattern associated with the playing song, each of the cue elements moving outward from a center of the ring toward one of the target elements.

2. The storage medium of claim 1, wherein each of the cue elements is associated to a particular one of the controllers and is configured to visually indicate such controller association.

3. The storage medium of claim 2, wherein the pattern is configured such that the cue elements travel in at least two, differing directions from the center of the ring.

4. The storage medium of claim 3, wherein the pattern is configured such that at least some of the cue elements are paired to travel concurrently from the ring center toward one of the target elements.

5. The storage medium of claim 1, wherein the ring is defined by at least six of the cue target elements positioned end-to-end at about a periphery of the ring.

6. The storage medium of claim 5, wherein the zones of the HUD ring comprise an up left zone, a left side zone, a left down zone, a right down zone, a right side zone, and an up right zone.

7. The storage medium of claim 1, further comprising sensing movement of the controllers, comparing the sensed movements of the controllers to the pattern of the cue elements displayed concurrently with the sensed movements, and generating a player score based on the comparing.

8. The storage medium of claim 1, wherein the center of the ring coincides with a center of the display screen and the method further comprises displaying background animation on the display screen with at least a portion beneath the HUD ring, the portion beneath the HUD ring comprising a player character moving rhythmically with the playing song.

9. The storage medium of claim 1, wherein a first set of the cue elements comprise wrist flick cues for the controllers and a second set of the cue elements comprise move and hold cues for the controllers.

10. A computer program for a video game stored in memory and controlling a processor of a computer or video game console of a video game system to implement a game with image output on a display screen, the video game system including first and second handheld controllers and logic adapted for sensing position and movement of the controllers, comprising:
   code for displaying on the display screen a user interface that includes a ring divided into zones and having a center proximate to a center of the display screen, the ring having six cue target elements positioned about a periphery of the ring with one placed in each of the zones; and
   code for generating visual cue elements emanating from the ring center and traveling at a cue velocity outward to cross the cue target elements in a multi-directional cue pattern, wherein a first set of the visual cue elements are associated with the first handheld controller and a second set of the visual cue elements are associated with the second handheld controller.

11. The video game computer program of claim 10, wherein the memory stores audio files for songs and wherein the cue pattern is configured to have the visual cue elements cross the cue target elements rhythmically when one of the songs is played by the video game system.

12. The video game computer program of claim 10, wherein in the multi-directional cue pattern a portion of the first set and second set of cue target elements are paired to cross the cue target elements concurrently, whereby two hand cues are provided to a player of the video game.

13. The video game computer program of claim 10, wherein the zones divide the area of the ring into six substantially equal pie-shaped segments with tips at the ring center and the zones include an up left zone, a left side zone, a down left zone, a down right zone, an right side zone, and an up right zone, whereby a player of the video game can be directed to move either of the handheld controllers in six differing directions relative to the ring center.

14. The video game computer program of claim 10, wherein the multi-direction cue pattern is configured such that a portion of cue target elements emanate from the ring center sequentially with a cue spacing to sequentially cross a plurality of the cue target elements.

15. The video game computer program of claim 14, further comprising code for comparing a sensed movement of the handheld controllers to determine whether a player has followed the multi-directional cue pattern by moving a corresponding one of the handheld controllers in one of six directions corresponding to the zones as one of the visual cue elements crosses one of the cue target elements.

16. A video game play method, comprising:
   displaying a set of target elements in a circular pattern on a video display;
   playing audio file;
   concurrently with the playing of the audio file, displaying a series of visual cue elements moving from a central portion of the video display outward toward the target elements, wherein the visual cue elements are each associated with one of a pair of handheld video game controllers and wherein only one of the visual cue elements associated with a particular one of the video game controllers contacts the target elements at a particular time; and
   determining movements of the video game controllers during the displaying of the visual cue elements and comparing the determined movements with timing of the visual cue elements contacting the target elements.

17. The method of claim 16, wherein at least some of the visual cue elements travel in opposite directions from the central portion toward the target elements.

18. The method of claim 16, wherein the set of target elements comprises at least six target elements positioned about a periphery of the circular pattern in an end-to-end pattern.

19. The method of claim 16, wherein the circular pattern is centered on the video display and the method further comprises displaying background animation including a player character on the video display with the player character being proximate to the target elements.

20. The method of claim 16, wherein the visual cue elements are displayed with at least two visual appearances during the movement from the central portion to the target elements to provide a visual cue on timing of performing the movements of the video game controllers about the circular pattern displayed on the video display and wherein the visual cue elements associated a first one of the video game controllers differ in color from the visual cue elements associated with a second one of the video game controllers.

* * * * *